United States Patent
Bhattacharya et al.

(10) Patent No.: US 12,045,197 B2
(45) Date of Patent: Jul. 23, 2024

(54) SIZE-BASED RECORD PARTITIONING

(71) Applicant: Salesforce, Inc., San Francisco, CA (US)

(72) Inventors: Dibyendu Bhattacharya, Bangalore (IN); Hongjun Fu, Redwood City, CA (US); Kishore Reddipalli, San Ramon, CA (US); Kadir Ozdemir, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 127 days.

(21) Appl. No.: 17/843,275

(22) Filed: Jun. 17, 2022

(65) Prior Publication Data

US 2023/0409524 A1    Dec. 21, 2023

(51) Int. Cl.
  G06F 16/13    (2019.01)
  G06F 16/16    (2019.01)
(52) U.S. Cl.
  CPC .............. G06F 16/13 (2019.01); G06F 16/16 (2019.01)
(58) Field of Classification Search
  CPC ................................. G06F 16/13; G06F 16/16
  See application file for complete search history.

(56) References Cited

U.S. PATENT DOCUMENTS

| | | | |
|---|---|---|---|
| 11,216,487 B1 * | 1/2022 | Goyal | G06F 16/212 |
| 11,263,270 B1 * | 3/2022 | Goyal | G06F 16/256 |
| 11,366,598 B1 * | 6/2022 | Goyal | G06F 3/0617 |
| 11,409,771 B1 * | 8/2022 | Goyal | G06F 16/2228 |
| 11,461,347 B1 * | 10/2022 | Das | G06F 16/2433 |
| 2022/0292543 A1 * | 9/2022 | Henderson | G06Q 30/0252 |

* cited by examiner

Primary Examiner — Eliyah S. Harper
(74) Attorney, Agent, or Firm — Holland & Hart LLP

(57) ABSTRACT

A database system is disclosed. The database system may receive a plurality of records representing changes made to a plurality of datasets, and the plurality of records may include a plurality of data change instances associated with a plurality of data schema types. The plurality of data change instances may correspond to a plurality of respective keys. The database system may compute an average size of data for each data schema type of the plurality of data schema types. The database system may modify the plurality of respective keys through a salting process, which may include assigning non-overlapping numerical ranges to subsets of the plurality of respective keys. The database system may sort, using the non-overlapping numerical ranges, the plurality of data change instances into a plurality of partitions of a target file size. The database system may write files of the target file size to a data store.

20 Claims, 10 Drawing Sheets

SIZE-BASED RECORD PARTITIONING

FIELD OF TECHNOLOGY

The present disclosure relates generally to database systems and data processing, and more specifically to size-based record partitioning.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, the cloud platform, a server, or other device may partition data for storage. However, such methods may be improved.

DETAILED DESCRIPTION

Figure 1:
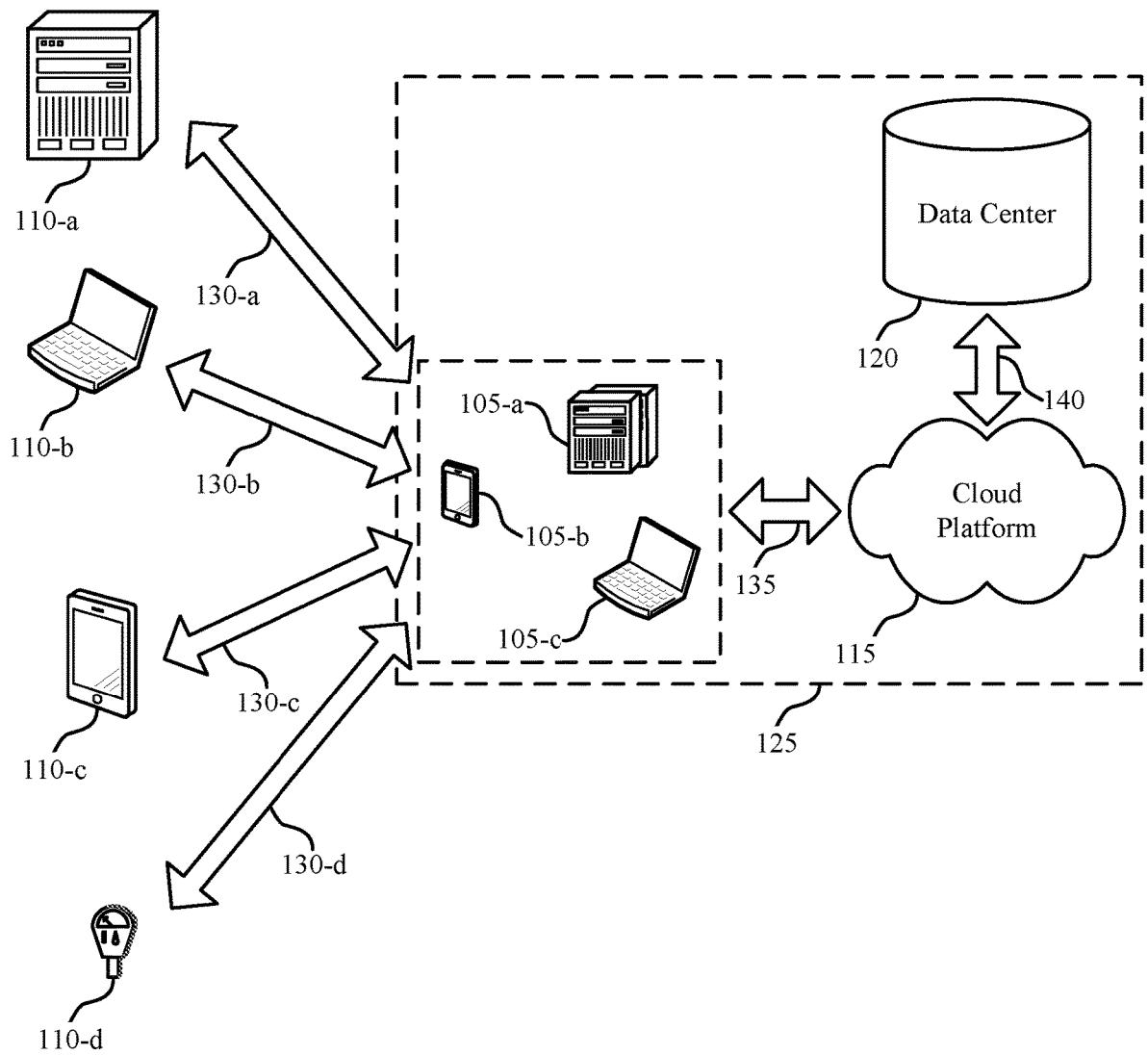
FIG. 1 illustrates an example of a data processing system that supports size-based record partitioning in accordance with examples as disclosed herein.

Database systems may track change events (e.g., writes/deletes) for analytics purposes and transmit records indicating these change events. These records may be categorized into different record types, each of which may be associated with different data schemas and may involve different amounts of traffic. For example, some record types may involve little traffic, while others may involve extensive traffic. In addition, the data distribution for each record type may also vary. Given the scale of users and information associated with some database systems, tracking such events may result in large numbers of events/records to be organized and recorded for later analysis. Thus, such incoming information needs to be partitioned for efficient storage, organization, and analysis at a later time. However, due to the variability of traffic and data distribution across the various change events, simply partitioning the data by the number of change events (e.g., 1000 events per partition) may result in unequal distribution of data across partitions, which may adversely affect processing of the partitions, particularly in a distributed processing environment.

To reduce or eliminate such limitations, partitions for storing these records may be based on data size, rather than a quantity of records. However, the size of individual records may not be known to the system when the records are received for processing. Instead, the system may receive many records of different record types in one or more files, and may only know the total size of the file being received. As the size of records within a record type are relatively consistent, the database system may analyze sizes of records associated with each record type to determine or calculate an average record size. Each record may be associated with a key, and a total size for each record type may then be determined or calculated (e.g., based on the average size and quantity of records for a record type) and non-overlapping partition ranges may be determined for each record type. The system may then "salt" the keys for each record type by assigning a number within the assigned range of the record type for each record of that record type. The various partitions (each of a target partition size) may then be formed based on the salted keys (e.g., keys of a same number may be grouped into the same partition). In this way, the resulting output partitions may be of a relatively consistent size regardless of variations present between the various record types (e.g., traffic amounts, record sizes, etc.), thereby increasing processing performance and stability of the processing system. For example, if a processing system accepts the various output partitions that are of a relatively consistent size, the processing performance may be increased since the load may be relatively balanced between different processing nodes, processors, or other elements, and the data processing may be performed with reduced waiting times at the individual nodes, processors, or other elements. Further, the relatively even load may increase stability of the processing system since such consistent size of partitions allows for relative uniformity across the different elements of the processing system.

In some examples, the database system may compute, generate, or determine the average sizes for the different record types by using an initial seed value and an iterative process to calculate the average record size for a record type. In some examples, the database system may determine a target file size for the final partitions. This target file size may be used with a total storage size of a group of records of a record type, a number of files, records, or partitions of a record type, or both, to determine the non-overlapping ranges to be used for the salting and partitioning processes. In some examples, the database system may assign random values from within the generated ranges to the various keys associated with a range to avoid uneven distribution of the data. In some examples, the ranges (and, in some examples, the output partitions) may each only contain records, change instances, change data, other information, or any combination thereof that are associated with a single record type.

Aspects of the disclosure are initially described in the context of an environment supporting an on-demand database service. Aspects of the disclosure are then described in the context of a data processing system, a partitioning procedure, and a process flow. Aspects of the disclosure are further illustrated by and described with reference to apparatus diagrams, system diagrams, and flowcharts that relate to size-based record partitioning.

FIG. 1 illustrates an example of a system 100 for cloud computing that supports size-based record partitioning in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

For example, in some implementations, the cloud platform 115 may receive records that contain information about changes made to elements of a database system or other elements of the cloud platform 115, another platform, or any combination thereof. These records may each be associated with a record type or data schema, and each record type or data schema may describe different changes made to the elements of a system. However, these records may be received in an input stream that is not organized and does not account for different amounts of data for the various data schemas. The cloud platform 115 may compute, retrieve, determine, or otherwise obtain an average size of data that is associated with the various data schemas, and may use those average sizes to determine non-overlapping ranges of values for the various data schemas that are to be used in a salting process. In the salting process, the cloud platform 115 may modify keys associated with instances of logged data changes (e.g., stored in the received records) to assign the various instances to the ranges and may then sort the various change instances using the modified (e.g., "salted") keys to create partitions that are of consistent sizes (e.g., even across different data schemas). The various partitions may then be written to storage (e.g., the data center 120 or other storage) for later retrieval by the cloud platform 115 or other devices (e.g., for analytics purposes).

In some database systems, large amounts of data may be generated by logging systems. These logging systems may log events (e.g., changes, modifications, etc.) across different features or aspects of a cloud platform and there may be many different such features or aspects, resulting in many different data schemas used to initially record the log events (e.g., in a stream of data). These log events may be stored for later retrieval (e.g., for analytics purposes) and may further be partitioned as part of this storage. However, the different features or aspects of the database system may be associated with varying levels of traffic, data, or other variables, and the size of the data schemas used to record these varying levels of information may further vary widely. Such variability and diversity of data amounts, data schemas or formats is not handled well by some existing approaches that partition by quantities or counts of events. For example, such approaches may assign more partitions to a data schema that may have a larger quantity of events, but the size of each partition may actually be smaller than partitions associated with data schemas that may have fewer events but larger data sizes for these events. Such storage approaches result in non-uniform partitions, which reduce processing performance and stability of the processing system. For example, as the performance of a database processing system that is storing such data depends at least in part on a quantity of files that are written, such performance may deteriorate as file counts increase. Further, if partition sizes are not equal, the load on machines which handle larger partitions will be heavy while other machines may be idle.

The approaches described herein resolve such problems by instead partitioning the various log events based on size, thereby offering relatively uniform partition sizes, thereby improving performance and stability of the database processing system. For example, as file sizes for a data schema may be relatively consistent, a database system may use such an average size of data, records, change instances, or other information to determine a number of output partitions should be written for the data, records, change instances, or other information to be stored. The database system may use the number of files in an input stream for a data schema and the average size of files that use the data schema to generate a total size of the files for the data schema, and may then use a target partition size and the total size of the files for the data schema to determine a number of partitions (e.g., of the target partition size) that are to be used for the data schema. The various change instances or records may then be associated with keys that may be modified to contain a value of a non-overlapping range of identifiers used to assign the change instances or records to different partitions, thereby resulting in relatively consistent or uniform partitions sizes, despite the widely varying characteristics of the various data schemas and features or aspects of the database system.

For example, a user may wish to retrieve historical logged data on modifications made to a cloud platform. Such historical logged data may be measured by the cloud platform or other platform, and may be transmitted to the database system for storage (e.g., so that the user can retrieve the information easily). The database system may receive the logged modification information and may partition the information based on the size of different types (e.g., data schemas) of the information. For example, the database system may use an average size of information stored using a data schema to determine a total size of information for the data schema and subsequently determine a number of partitions of a target size that are to be created by the database system for storing the information. In this way, the database system may create partitions of a relatively uniform size, despite variation in size and quantity of files of the logged modification information. Since the partitions are of a relatively uniform size, processing performance and stability of the database system are improved since, among other desirable characteristics, the load of processing the uniform partitions is relatively consistent across different machines. Additionally, such uniform distribution may also reduce latency and improve query performance, since processing nodes or machines may be engaged more consistently, with fewer idle periods. or with shorter idle periods.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
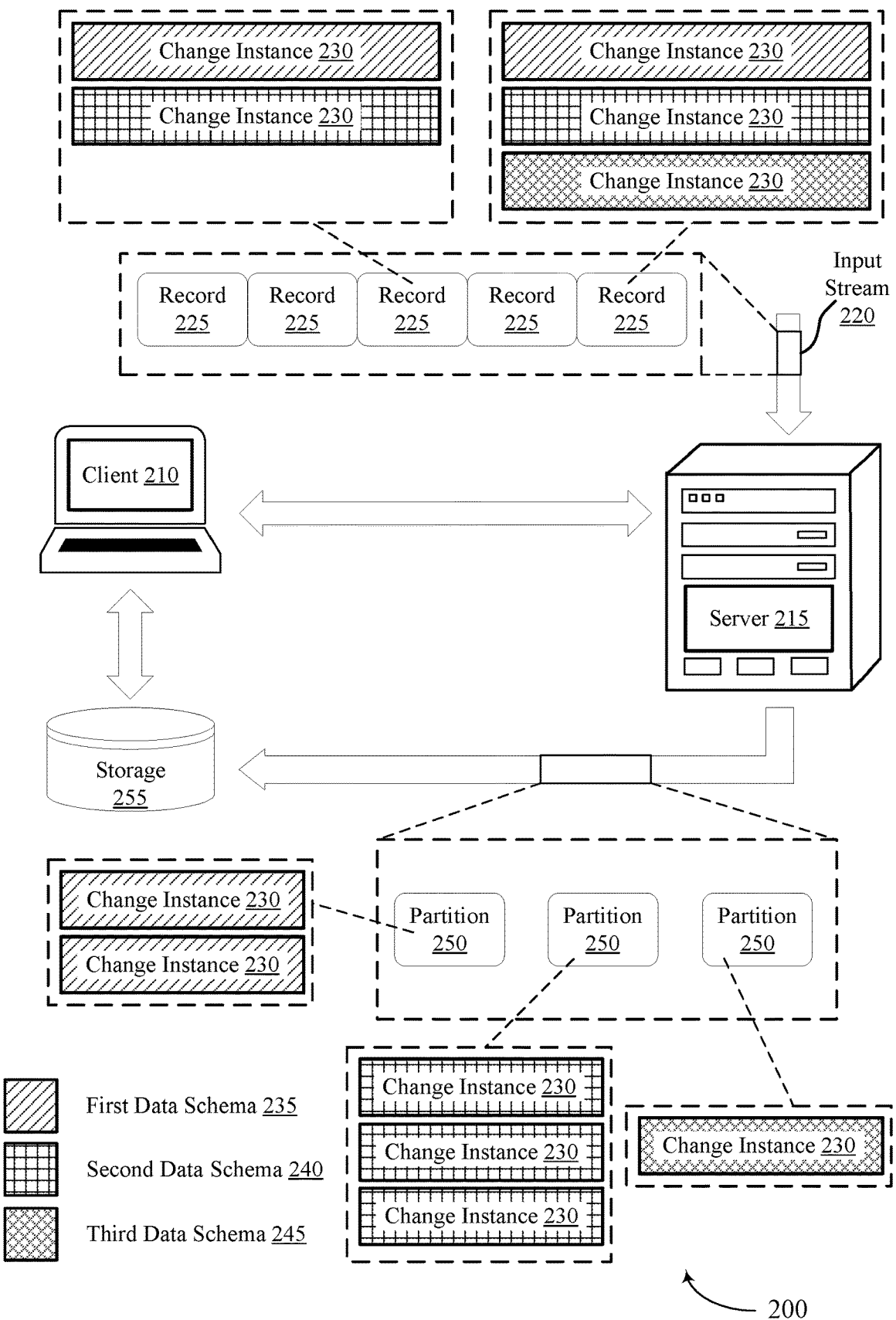
FIG. 2 illustrates an example of a data processing system that supports size-based record partitioning in accordance with examples as disclosed herein.

FIG. 2 illustrates an example of a data processing system 200 that supports size-based record partitioning in accordance with examples as disclosed herein. The data processing system may include or involve the use of the server 215 and the storage 255. Though the server 215 is depicted and discussed as a single entity, multiple entities or elements may also perform or use the approaches described herein.

As described herein, approaches for partitioning data for storage and later retrieval may be improved, particularly when the data that is to be stored varies widely in size, number, format, or any combination thereof. For example, such information may represent changes or modifications made to a cloud platform. These changes may be recorded by the cloud platform or by another entity that monitors changes made to the cloud platform.

These changes may be represented or stored as change instances, such as the change instances 230. Such change instances may also be referred to as data change instances. The change instances 230 may be associated with a data schema, such as the first data schema 235, the second data schema 240, the third data schema 245, another data schema, or any combination thereof. For example, information associated with the changes that were made to the cloud platform may be stored using the first data schema 235 in that the information stored in the change instance 230 may be information that is recorded for multiple changes made to a feature or element of the cloud platform and that information may be stored in a format associated with the first data schema 235.

Each of the data schemas may contain or be associated with a number of fields, and the fields may be dynamic fields or may be static fields. For example, a given data schema (e.g., the second data schema 240) may include some static fields (e.g., which remain mostly unchanged across data schemas). Additionally, or alternatively, a given data schema may contain dynamic fields which may be unique to one or more data schemas. For example, the first data schema 235 may have 100 dynamic fields and the third data schema 245 may have 500 dynamic fields. In such an example (that ignores static fields), assuming that each dynamic field contributes more or less equally towards the size of a data schema (e.g., one unit of data), a change event or change instance 230 for the first data schema 235 would have a size approximately 100 units and one change event or change instance 230 of the third data schema 245 would have a size of 500 units. Such an example does not limit the scope of the subject matter described herein and other factors may contribute to differences between data schemas that may be accounted for by the subject matter described herein.

In the approaches described herein, the server 215 or other elements or entities may derive, calculate, or otherwise obtain sizes of data included in a change instance 230 associated with a data schema. For example, the server 215 may analyze previous change instances 230 to determine an average size of the change instances 230.

In some examples, the server 215 (or other entity performing at least a portion of the approaches described herein) may receive an input stream 220 that includes one or more records 225. The records 225 may each include one or more change instances 230 that may be associated with the first data schema 235, the second data schema 240, the third data schema 245, or any combination thereof. For example, the records 225 may include one or more change instances 230 that may include information that is included, formatted, or both according to a data schema. As a further example, the change instances 230 may include data that is specified by one or more data schemas that may indicate or be associated with one or more changes or modifications made to a cloud platform or other system.

The server 215 may create the partitions 250 using the approaches described herein, and each partition 250 may include one or more change instances 230 that are associated with a data schema (e.g., the first data schema 235, the second data schema 240, or the third data schema 245). In some examples, each partition 250 may only include changes instances 230 or other information that is associated with a single data schema. Further, in some examples, the partitions 250 may be of a relatively consistent size, despite possible variations in size of individual change instances 230. For example, some partitions 250 may include greater or lesser quantities of change instances 230. A partition 250 containing larger-sized change instances 230 may include fewer such change instances 230, while a partition 250 containing smaller-sized change instances 230 may include a greater quantity of change instances 230.

For example, given a batch of the input stream 220 that includes a number of records 225, the records 225 including 10,000 change instances 230 that use the first data schema 235 and 2,000 change instances 230 that use the third data schema 245. Assuming that, as in another example provided herein, each field contributes substantially equally towards the size of a data schema (e.g., one unit of data) and that a change event or change instance 230 for the first data schema 235 would have a size of 100 units and one change event or change instance 230 of the third data schema 245 would have a size 500 units. The server 215 may calculate a total size for all change instances 230 of the first data schema 235 and all change instances 230 of the second data schema 240. For example, a total size of change instances 230 for the first data schema 235 may be 10,000 change instances multiplied by 100 units for each change instance 230, resulting in $10^6$ units of storage for the first data schema 235. Similarly, a total size of change instances 230 for the second data schema 240 may be 2,000 change instances 230 multiplied by 500 units for each change instance 230, resulting in $10^6$ units of storage for the second data schema 240. As shown, even though the third data schema 245 may have fewer change instances 230 than the first data schema 235, the combined size of all the change instances 230 in the batch is the same due to a greater number of fields in the third data schema 245.

In this example, were the server 215 or other entity to partition the change instances 230 into partitions 250 based on a number of events, the sizes of the partitions would be very different. Given a division of 10 partitions for the change instances 230 associated with the first data schema 235 and 2 partitions for the change instances 230 (e.g., 1,000 change instances per partition 250), the size of the partitions 250 associated with the first data schema 235 would have been $10^5$ units, calculated from the 1,000 change instances per partition 250 multiplied by the 100 units per change instance 230. However, the size of the partitions 250 associated with the third data schema 245 would be $5*10^5$ units, calculated from the 1,000 change instances per partition 250 multiplied by the 500 units per change instance 230. Such a distribution of sizes across partitions would not be uniform, as the partition size of partitions 250 associated with the third data schema 245 would be approximately five times the size of partitions 250 associated with the first data schema 235.

Such a scenario may lead to multiple issues, including the following. First, the partition sizes generated by would have been uneven. Some data schemas may generate larger-sized change instances 230 or other files, whereas others may have smaller-sized change instances 230 or other files. Second, writing larger partitions 250 to the storage 255 may take more time. For example, partitions 250 associated with the third data schema 245 in the above example would be written much slower than those of the first data schema 235 as the partitions 250 associated with the third data schema 245 would have more data to write. Third, in distributed systems, if a given machine handles a greater quantity of larger partitions than other machines, such a machine may run more slowly.

However, if the partitions 250 are arranged by taking size of the change instances 230 into account, such issues may be reduced or eliminated. For example, given a target partition size of $10^5$ units, then the change instances 230 associated with the first data schema 235 may be divided into 10 partitions (e.g., calculated by the total size of the change instances 230 for the first data schema 235 being $10^6$ units divided by the target partition size of $10^5$ units). Similarly, the change instances 230 associated with the third data schema 245 may also be divided into 10 partitions (e.g., calculated by the total size of the change instances 230 for the third data schema 245 being $10^6$ units divided by the target partition size of $10^5$ units). In this way, even though there are fewer change instances 230 associated with the third data schema 245 than with the first data schema 235, both were divided into equally-sized partitions. In this way, an even load may be distributed across multiple machines, time for writing partitions by the various machines may be similar and a processing cluster of such multiple machines may be better utilized, thereby increasing performance and reducing latency.

The server 215, after having formed, determined, or generated the partitions 250, may write the partitions 250 to the storage 255, from which the client 210 may access the stored information about the changes made to the cloud platform. The client 210 may access the stored change instances for various purposes, including for analytics purposes to determine or calculate information about the changes made to the cloud platform.

Figure 3:
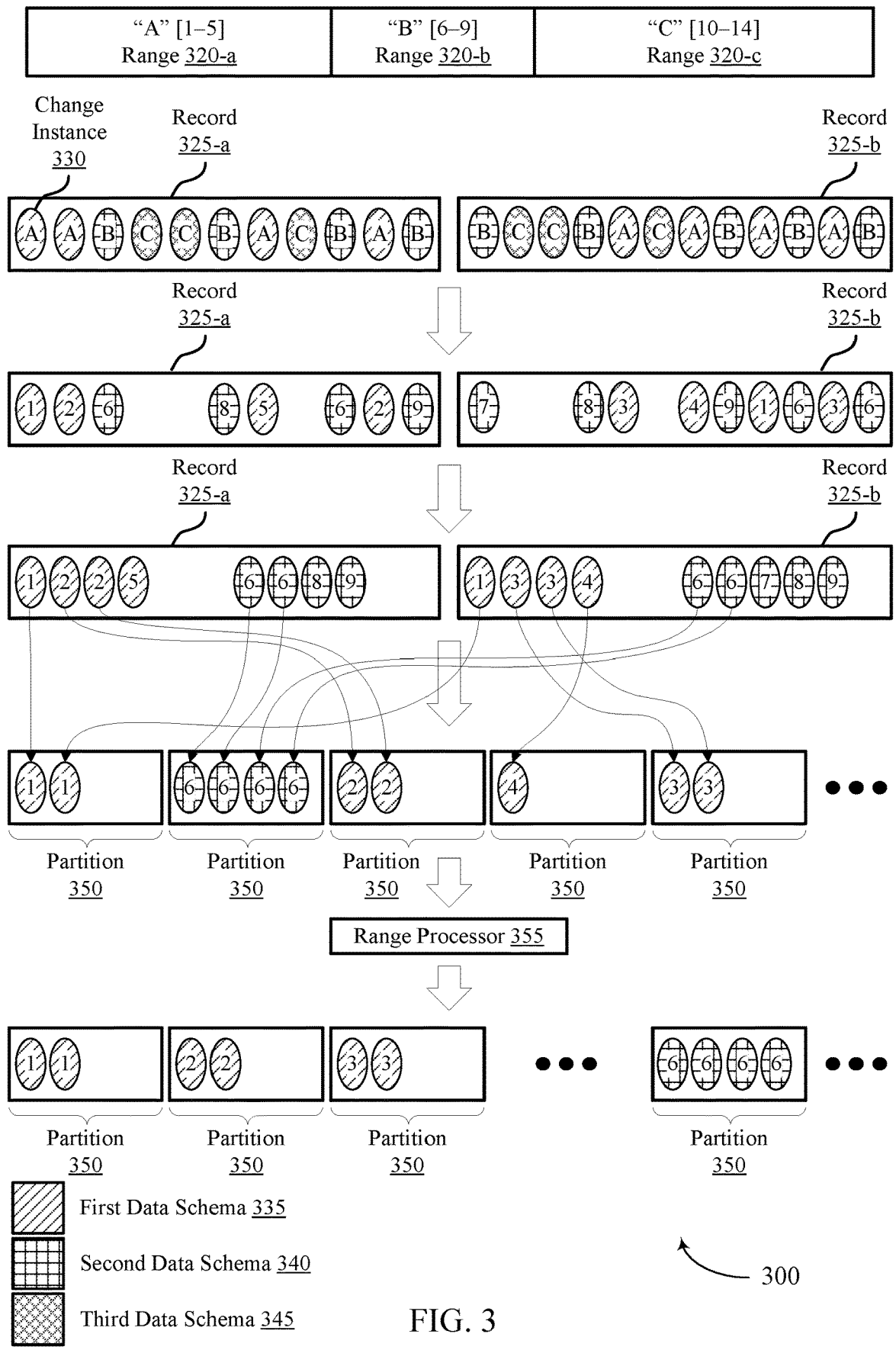
FIG. 3 illustrates an example of a partitioning procedure that supports size-based record partitioning in accordance with examples as disclosed herein.

FIG. 3 illustrates an example of a partitioning procedure 300 that supports size-based record partitioning in accordance with examples as disclosed herein. The partitioning procedure 300 may include a quantity of change instances 330 included in a quantity of records 325 and the change instances 330 may be organized into the various partitions 350 using the approaches described herein (e.g., based on the different data schemas, including the first data schema 335, the second data schema 340, and the third data schema 345 as examples). In some examples, some or all of the partitioning procedure 300, other subject matter described herein, or both, may be performed in memory of the server 215, one or more entities (e.g., processing nodes or machines), one or more devices, or any combination thereof.

The partitioning procedure 300 may consider or take advantage of various characteristics of the change instances 330. In some examples, sizes of log records (e.g., the change instances 330) may be relatively uniform among such records or change instances 330 that are associated with the same data schema. Further, such sizes may also be relatively stable or consistent over time. However, such sizes of change instances 330 or other log records may vary across different data schemas.

As such, the partitioning procedure 300 may include calculating an average size of the change instances 330 or other records by first setting an initial seed value (e.g., 256 bytes per change instance 330 or other record). The partitioning procedure 300 may further include generating an output and recalculating the average size of change instances 330 or other records or data associated with a data schema by dividing the output size and record count. In some examples, the partitioning procedure 300 may further include lowering the deviation of the calculated average by performing this procedure through multiple iterations to further calibrate a result.

Once the average size of the change instances 330 is known, calculated, or otherwise obtained, the records 325 may be read (e.g., on the scale of around 50,000 files in a 5 minute batch). After reading all 50,000 files, a pair distributed dataset may be generated. Such a pair distributed dataset may hold key-value pairs. For example, a key may include an indication of an associated data schema, a data, a time, additional information or identifiers, or any combination thereof. A value may include, for example, a JavaScript Object Notation (JSON) payload (e.g., that may describe one or more changes made to a cloud platform). Additionally, or alternatively, a count of a quantity of change instances 330 may be performed to obtain a quantity of change instances 330 that bear each key (e.g., that are associated with one or more data schemas). Such a count, designation, or mapping is depicted in FIG. 3 by the "A", "B", and "C" notation. For example, the "A" notation may indicate a first key that may be associated with the first data schema 335, the "B" notation may indicate a first key that may be associated with the second data schema 340, and the "C" notation may indicate a first key that may be associated with the third data schema 345.

Once this mapping is determined, the partitioning procedure 300 may include using the average size of the change instances 330 associated with a data schema and the count of the change instances 330 to generate, calculate, or otherwise obtain a total size of the data associated with the data schema. For example, the partitioning procedure 300 may include using the obtained quantity of all of the "A" change instances 330 and the average size of such "A" change instances 330 to determine a total size of the "A" change instances collectively. Given this total size, the partitioning procedure 300 may further include generating, calculating, or otherwise obtaining a quantity of partitions 350 that may be used for the "A" change instances 330, and this may be done based on a target size for the partitions 350 (e.g., the target size for all of the partitions 350, regardless of which data schema is associated with the change instances 330 therein). Further, the partitioning procedure 300 may include generating, calculating, or otherwise obtaining a number of partitions for each key (e.g., "A", "B", "C", etc.).

The partitioning procedure 300 may further include calculating, generating, or otherwise obtaining non-overlapping ranges (e.g., ranges 320) for each of the various keys being used. For example, if the "A" key needs 5 partitions, then range 320-a may be created that may span 1-5 inclusive. Similarly if the "B" key needs 4 partitions, then range 320-b may be created that may span 6-9 inclusive, and if the "C" key needs 5 partitions, then range 320-c may be created that may span 10-14 inclusive. Such non-overlapping ranges may be deterministic (e.g., for a given batch of received change instances 330).

Once the range is available for a key, the dataset may be "salted" with values from the range. For example, the key for a range may be changed from an original value (e.g., represented by "A", "B", and "C") to any random value within the range of the given key. For example, for the "A" change instances 330, values from the range 320-a (e.g., 1-5) may be assigned to the various "A" change instances 330, as shown in FIG. 3. Similarly, for the values from the range 320-b (e.g., 6-9) may be assigned to the various "B" change instances 330 as shown in FIG. 3.

In some examples, these various change instances 330 with the modified key values may then be sorted (e.g., in an order, such as an ascending or descending order, based on the assigned values corresponding to the respective ranges). Further, the various change instances 330 may also be assigned to be written to various partitions 350. For example, some or all of the partitions 350 may contain or may be assigned to contain change instances 330 that are of a same range value (e.g., 1, 2, 3, etc.) that was included in associated keys.

In some examples, the partitioning procedure 300 may include the use of a range processor 355, which may also be referred to as a range partitioner. In some other approaches, a range processor 355 or range partitioner operates by sampling an original paired dataset. However, since a precise count of the elements of the keys was performed earlier in the partitioning procedure 300, such sampling is not necessary. Rather, a key 1 mapping paired dataset may be "mocked", in which the key is repeated a quantity of times. Thus, an accurate paired dataset that represents the original distribution of the keys may be used. The range processor 355 or range partitioner may be created using such a mocked paired dataset. In this way, high costs normally associated with sampling of a large dataset, as well as the inaccurate nature of sampling, are avoided.

Once the range processor 355 or range partitioner is applied, the various change instances 330 that have been processed in memory (e.g., through the partitioning procedure 300 or other subject matter described herein) may be written in the various partitions 350 (e.g., to a storage, such as the storage 255 discussed in relation to FIG. 2).

In this way, the partitioning procedure 300 may partition the incoming log data (e.g., in the form of change instances 230) in relatively consistent partition sizes, offering increased performance, improved stability, reduced latency, or any combination thereof, any or all of which may apply to both the partitioning approaches themselves as well as to retrieval of the information at a later time (e.g., for analytics purposes).

Figure 4:
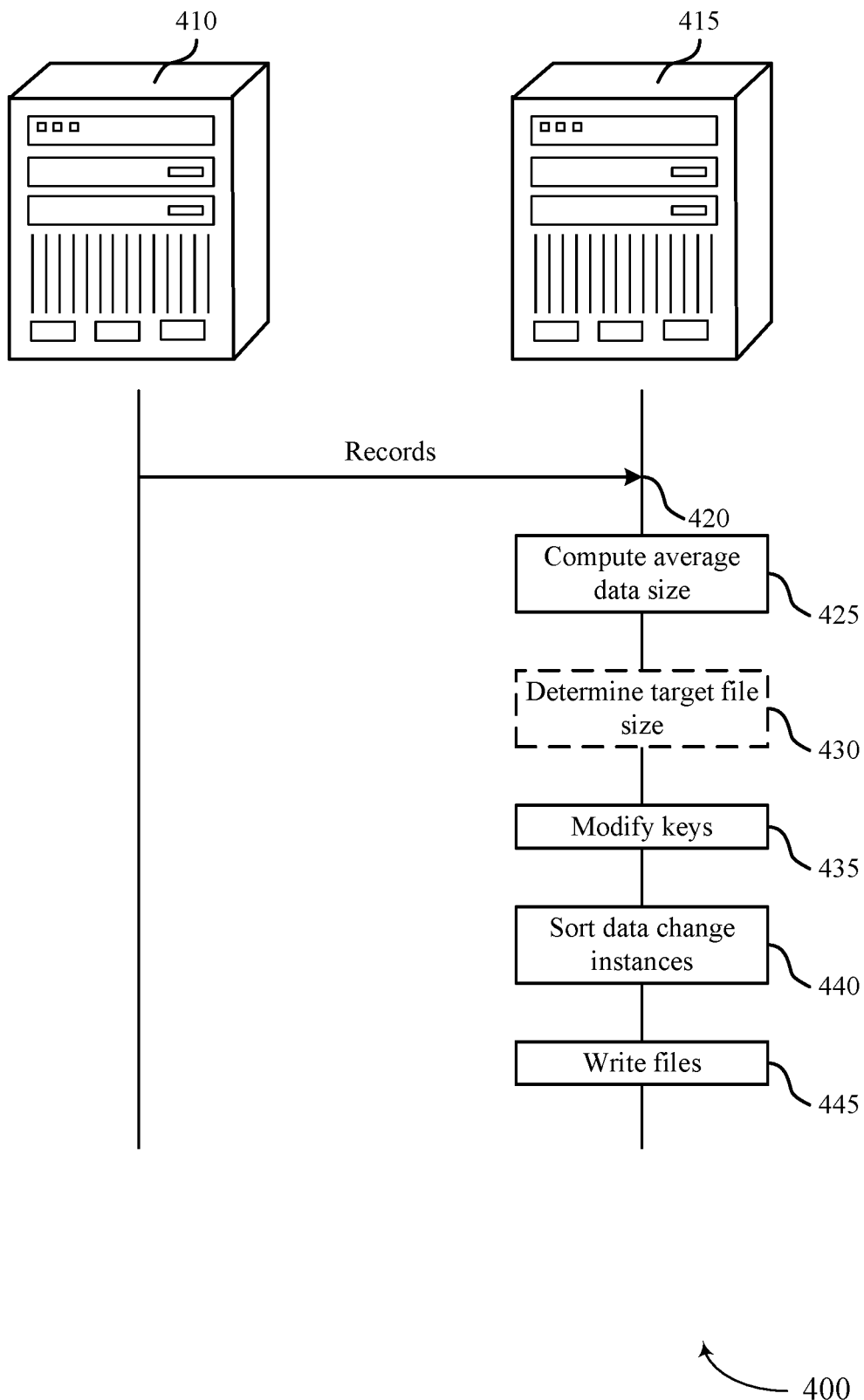
FIG. 4 illustrates an example of a process flow that supports size-based record partitioning in accordance with examples as disclosed herein.

FIG. 4 illustrates an example of a process flow 400 that supports size-based record partitioning in accordance with examples as disclosed herein. The process flow 400 may implement various aspects of the present disclosure described herein (e.g., the logging server 410 and the application server 415). The elements described in the process flow 400 may be examples of similarly-named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the application server 415 may receive a plurality of records representing changes made to a plurality of datasets, the plurality of records that may include a plurality of data change instances associated with a plurality of data schema types and the plurality of data change instances corresponds to a plurality of respective keys At 425, the application server 415 may compute an average size of data for each data schema type of the plurality of data schema types. In some examples, to compute the average size of data for each data schema type of the plurality of data schema types, the application server 415 may define respective initial size values for each data schema type, generate respective total output size values for each data schema type based on the respective initial size values, and generate respective average size values for each data schema type based on the respective total output size values and respective quantities of the data change instances associated with each data schema type.

At 430, the application server 415 may determine the target file size for the plurality of partitions. In some examples, the application server 415 may calculate total storage sizes for individual data schema types of the plurality of data schema types based on the target file size and may further determine the non-overlapping numerical ranges based on the total storage sizes for the individual data schema types. Additionally, or alternatively, the application server 415 may determine a quantity of files associated with individual data schema types of the plurality of data schema types based on the target file size and may further determine the non-overlapping numerical ranges based on the quantity of files associated with the individual data schema types.

At 435, the application server 415 may modify the plurality of respective keys through a salting process and the salting process may include assigning non-overlapping numerical ranges to subsets of the plurality of respective keys. In some examples, the salting process may include assigning the non-overlapping numerical ranges to the subsets of the plurality of respective keys based on each subset of the plurality of respective keys being associated with one of the plurality of data schema types. In some examples, the salting process may include assigning random values from the non-overlapping numerical ranges to individual keys of the subsets of the plurality of respective keys. In some examples, one or more of the plurality of respective keys comprise one of the plurality of data schema types, a date, a time, or any combination thereof.

At 440, the application server 415 may sort, using the non-overlapping numerical ranges, the plurality of data change instances into a plurality of partitions of a target file size. In some examples, the application server 415 may sort the plurality of data change instances into the plurality of partitions using a range partitioner that samples an entirety of the plurality of records. In some examples, each partition may only include files of a same data schema type.

At 445, the application server 415 may write files of the target file size to a data store. These files may then be retrieved by a user device or other device to retrieve the information stored in the written files. For example, the written files may be retrieved for analytics purposes (e.g., to analyze the changes made to the systems that generated the logs in the first place).

Figure 5:
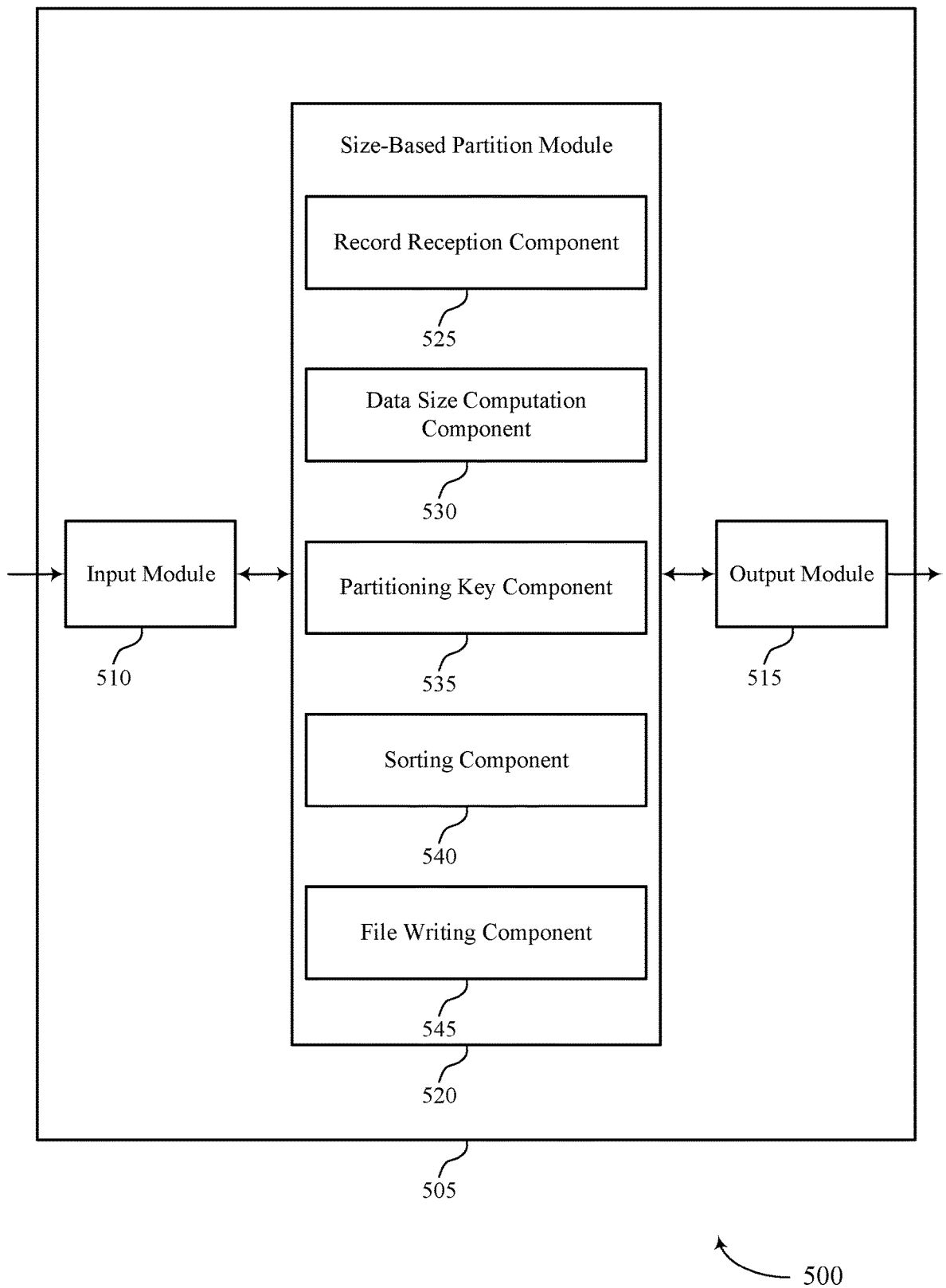
FIG. 5 shows a block diagram of an apparatus that supports size-based record partitioning in accordance with examples as disclosed herein.

FIG. 5 shows a block diagram 500 of a device 505 that supports size-based record partitioning in accordance with examples as disclosed herein. The device 505 may include an input module 510, an output module 515, and a size-based partition module 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the size-based partition module 520 to support size-based record partitioning. In some cases, the input module 510 may be a component of an I/O controller 710 as described with reference to FIG. 7.

The output module 515 may manage output signals for the device 505. For example, the output module 515 may receive signals from other components of the device 505, such as the size-based partition module 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the size-based partition module 520 may include a record reception component 525, a data size computation component 530, a partitioning key component 535, a sorting component 540, a file writing component 545, or any combination thereof. In some examples, the size-based partition module 520, or various components thereof, may be configured to perform various operations (e.g., receiving, monitoring, transmitting) using or otherwise in cooperation with the input module 510, the output module 515, or both. For example, the size-based partition module 520 may receive information from the input module 510, send information to the output module 515, or be integrated in combination with the input module 510, the output module 515, or both to receive information, transmit information, or perform various other operations as described herein.

The record reception component 525 may be configured as or otherwise support a means for receiving a set of multiple records representing changes made to a set of multiple datasets, the set of multiple records including a set of multiple data change instances associated with a set of multiple data schema types, where the set of multiple data change instances corresponds to a set of multiple respective keys. The data size computation component 530 may be configured as or otherwise support a means for computing an average size of data for each data schema type of the set of multiple data schema types. The partitioning key component 535 may be configured as or otherwise support a means for modifying the set of multiple respective keys through a salting process, where the salting process includes assigning non-overlapping numerical ranges to subsets of the set of multiple respective keys. The sorting component 540 may be configured as or otherwise support a means for sorting, using the non-overlapping numerical ranges, the set of multiple data change instances into a set of multiple partitions of a target file size. The file writing component 545 may be configured as or otherwise support a means for writing files of the target file size to a data store.

Figure 6:
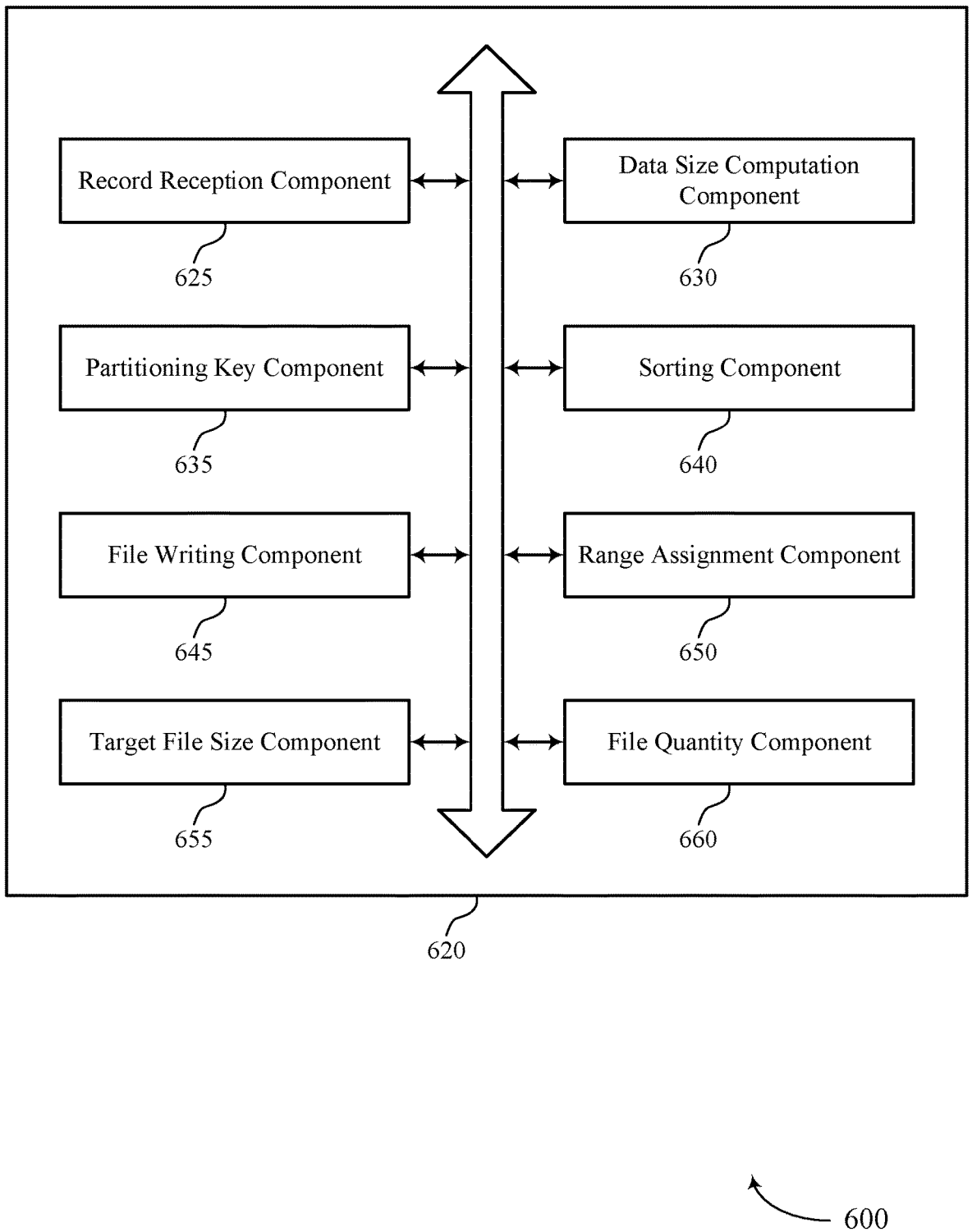
FIG. 6 shows a block diagram of a size-based partition module that supports size-based record partitioning in accordance with examples as disclosed herein.

FIG. 6 shows a block diagram 600 of a size-based partition module 620 that supports size-based record partitioning in accordance with examples as disclosed herein. The size-based partition module 620 may be an example of aspects of a size-based partition module or a size-based partition module 520, or both, as described herein. The size-based partition module 620, or various components thereof, may be an example of means for performing various aspects of size-based record partitioning as described herein. For example, the size-based partition module 620 may include a record reception component 625, a data size computation component 630, a partitioning key component 635, a sorting component 640, a file writing component 645, a range assignment component 650, a target file size component 655, a file quantity component 660, or any combination thereof. Each of these components may communicate, directly or indirectly, with one another (e.g., via one or more buses).

The record reception component 625 may be configured as or otherwise support a means for receiving a set of multiple records representing changes made to a set of multiple datasets, the set of multiple records including a set of multiple data change instances associated with a set of multiple data schema types, where the set of multiple data change instances corresponds to a set of multiple respective keys. The data size computation component 630 may be configured as or otherwise support a means for computing an average size of data for each data schema type of the set of multiple data schema types. The partitioning key component 635 may be configured as or otherwise support a means for modifying the set of multiple respective keys through a salting process, where the salting process includes assigning non-overlapping numerical ranges to subsets of the set of multiple respective keys. The sorting component 640 may be configured as or otherwise support a means for sorting, using the non-overlapping numerical ranges, the set of multiple data change instances into a set of multiple partitions of a target file size. The file writing component 645 may be configured as or otherwise support a means for writing files of the target file size to a data store.

In some examples, to support computing the average size of data for each data schema type of the set of multiple data schema types, the data size computation component 630 may be configured as or otherwise support a means for defining respective initial size values for each data schema type. In some examples, to support computing the average size of data for each data schema type of the set of multiple data schema types, the data size computation component 630 may be configured as or otherwise support a means for generating respective total output size values for each data schema type based on the respective initial size values. In some examples, to support computing the average size of data for each data schema type of the set of multiple data schema types, the data size computation component 630 may be configured as or otherwise support a means for generating respective average size values for each data schema type based on the respective total output size values and respective quantities of the data change instances associated with each data schema type.

In some examples, to support salting process, the range assignment component 650 may be configured as or otherwise support a means for assigning the non-overlapping numerical ranges to the subsets of the set of multiple respective keys based on each subset of the set of multiple respective keys being associated with one of the set of multiple data schema types.

In some examples, to support salting process, the partitioning key component 635 may be configured as or otherwise support a means for assigning random values from the non-overlapping numerical ranges to individual keys of the subsets of the set of multiple respective keys.

In some examples, the target file size component 655 may be configured as or otherwise support a means for determining the target file size for the set of multiple partitions.

In some examples, the data size computation component 630 may be configured as or otherwise support a means for calculating total storage sizes for individual data schema types of the set of multiple data schema types based on the target file size. In some examples, the range assignment component 650 may be configured as or otherwise support a means for determining the non-overlapping numerical ranges based on the total storage sizes for the individual data schema types.

In some examples, the file quantity component 660 may be configured as or otherwise support a means for determining a quantity of files associated with individual data schema types of the set of multiple data schema types based on the target file size. In some examples, the range assignment component 650 may be configured as or otherwise support a means for determining the non-overlapping numerical ranges based on the quantity of files associated with the individual data schema types.

In some examples, the sorting component 640 may be configured as or otherwise support a means for sorting the set of multiple data change instances into the set of multiple partitions using a range partitioner that samples an entirety of the set of multiple records.

In some examples, each partition only includes files of a same data schema type.

In some examples, one or more of the set of multiple respective keys include one of the set of multiple data schema types, a date, a time, or any combination thereof.

Figure 7:
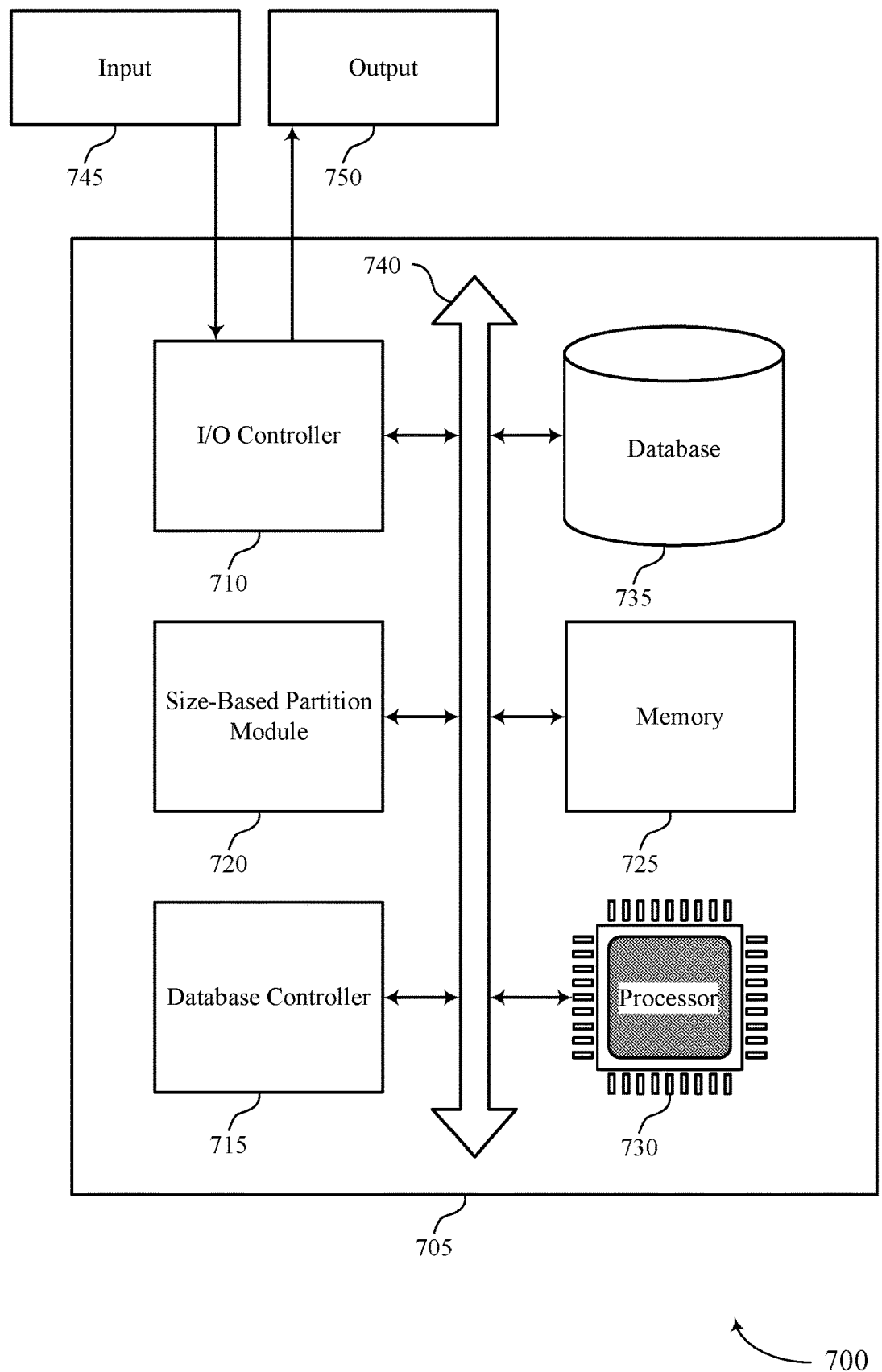
FIG. 7 shows a diagram of a system including a device that supports size-based record partitioning in accordance with examples as disclosed herein.

FIG. 7 shows a diagram of a system 700 including a device 705 that supports size-based record partitioning in accordance with examples as disclosed herein. The device 705 may be an example of or include the components of a device 505 as described herein. The device 705 may include components for bi-directional data communications including components for transmitting and receiving communications, such as a size-based partition module 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting size-based record partitioning).

For example, the size-based partition module 720 may be configured as or otherwise support a means for receiving a set of multiple records representing changes made to a set of multiple datasets, the set of multiple records including a set of multiple data change instances associated with a set of multiple data schema types, where the set of multiple data change instances corresponds to a set of multiple respective keys. The size-based partition module 720 may be configured as or otherwise support a means for computing an average size of data for each data schema type of the set of multiple data schema types. The size-based partition module 720 may be configured as or otherwise support a means for modifying the set of multiple respective keys through a salting process, where the salting process includes assigning non-overlapping numerical ranges to subsets of the set of multiple respective keys. The size-based partition module 720 may be configured as or otherwise support a means for sorting, using the non-overlapping numerical ranges, the set of multiple data change instances into a set of multiple partitions of a target file size. The size-based partition module 720 may be configured as or otherwise support a means for writing files of the target file size to a data store.

By including or configuring the size-based partition module 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 8:
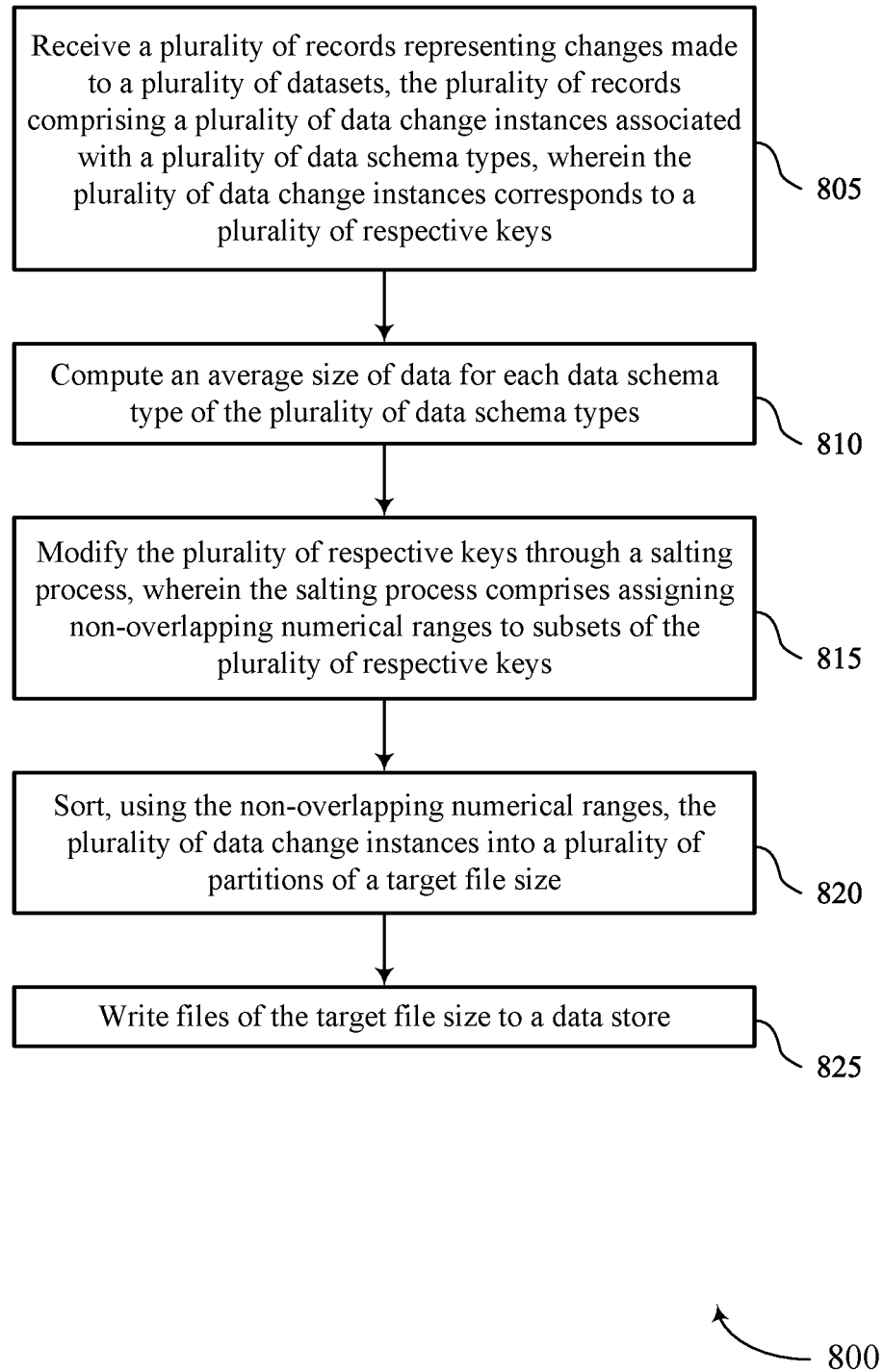
FIGS. 8 through 10 show flowcharts illustrating methods that support size-based record partitioning in accordance with examples as disclosed herein.

FIG. 8 shows a flowchart illustrating a method 800 that supports size-based record partitioning in accordance with examples as disclosed herein. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 805, the method may include receiving a set of multiple records representing changes made to a set of multiple datasets, the set of multiple records including a set of multiple data change instances associated with a set of multiple data schema types, where the set of multiple data change instances corresponds to a set of multiple respective keys. The operations of 805 may be performed in accordance with examples as disclosed herein. In some examples, aspects of the operations of 805 may be performed by a record reception component 625 as described with reference to FIG. 6.

At 810, the method may include computing an average size of data for each data schema type of the set of multiple data schema types. The operations of 810 may be performed in accordance with examples as disclosed herein. In some examples, aspects of the operations of 810 may be performed by a data size computation component 630 as described with reference to FIG. 6.

At 815, the method may include modifying the set of multiple respective keys through a salting process, where the salting process includes assigning non-overlapping numerical ranges to subsets of the set of multiple respective keys. The operations of 815 may be performed in accordance with examples as disclosed herein. In some examples, aspects of the operations of 815 may be performed by a partitioning key component 635 as described with reference to FIG. 6.

At 820, the method may include sorting, using the non-overlapping numerical ranges, the set of multiple data change instances into a set of multiple partitions of a target file size. The operations of 820 may be performed in accordance with examples as disclosed herein. In some examples, aspects of the operations of 820 may be performed by a sorting component 640 as described with reference to FIG. 6.

At 825, the method may include writing files of the target file size to a data store. The operations of 825 may be performed in accordance with examples as disclosed herein. In some examples, aspects of the operations of 825 may be performed by a file writing component 645 as described with reference to FIG. 6.

Figure 9:
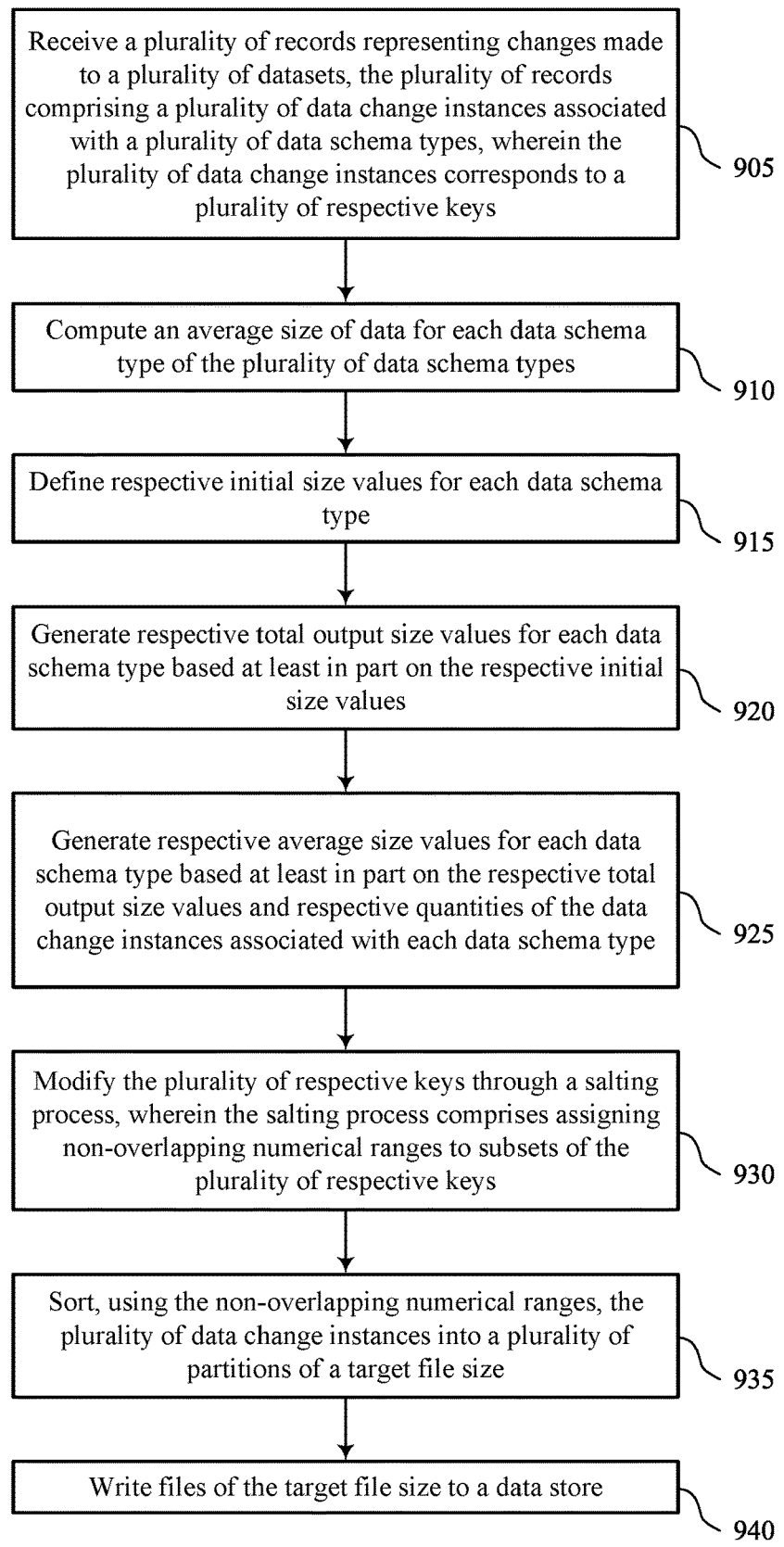

FIG. 9 shows a flowchart illustrating a method 900 that supports size-based record partitioning in accordance with examples as disclosed herein. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 905, the method may include receiving a set of multiple records representing changes made to a set of multiple datasets, the set of multiple records including a set of multiple data change instances associated with a set of multiple data schema types, where the set of multiple data change instances corresponds to a set of multiple respective keys. The operations of 905 may be performed in accordance with examples as disclosed herein. In some examples, aspects of the operations of 905 may be performed by a record reception component 625 as described with reference to FIG. 6.

At 910, the method may include computing an average size of data for each data schema type of the set of multiple data schema types. The operations of 910 may be performed in accordance with examples as disclosed herein. In some examples, aspects of the operations of 910 may be performed by a data size computation component 630 as described with reference to FIG. 6.

At 915, the method may include defining respective initial size values for each data schema type. The operations of 915 may be performed in accordance with examples as disclosed herein. In some examples, aspects of the operations of 915 may be performed by a data size computation component 630 as described with reference to FIG. 6.

At 920, the method may include generating respective total output size values for each data schema type based on the respective initial size values. The operations of 920 may be performed in accordance with examples as disclosed herein. In some examples, aspects of the operations of 920 may be performed by a data size computation component 630 as described with reference to FIG. 6.

At 925, the method may include generating respective average size values for each data schema type based on the respective total output size values and respective quantities of the data change instances associated with each data schema type. The operations of 925 may be performed in accordance with examples as disclosed herein. In some examples, aspects of the operations of 925 may be performed by a data size computation component 630 as described with reference to FIG. 6.

At 930, the method may include modifying the set of multiple respective keys through a salting process, where the salting process includes assigning non-overlapping numerical ranges to subsets of the set of multiple respective keys. The operations of 930 may be performed in accordance with examples as disclosed herein. In some examples, aspects of the operations of 930 may be performed by a partitioning key component 635 as described with reference to FIG. 6.

At 935, the method may include sorting, using the non-overlapping numerical ranges, the set of multiple data change instances into a set of multiple partitions of a target file size. The operations of 935 may be performed in accordance with examples as disclosed herein. In some examples, aspects of the operations of 935 may be performed by a sorting component 640 as described with reference to FIG. 6.

At 940, the method may include writing files of the target file size to a data store. The operations of 940 may be performed in accordance with examples as disclosed herein. In some examples, aspects of the operations of 940 may be performed by a file writing component 645 as described with reference to FIG. 6.

Figure 10:
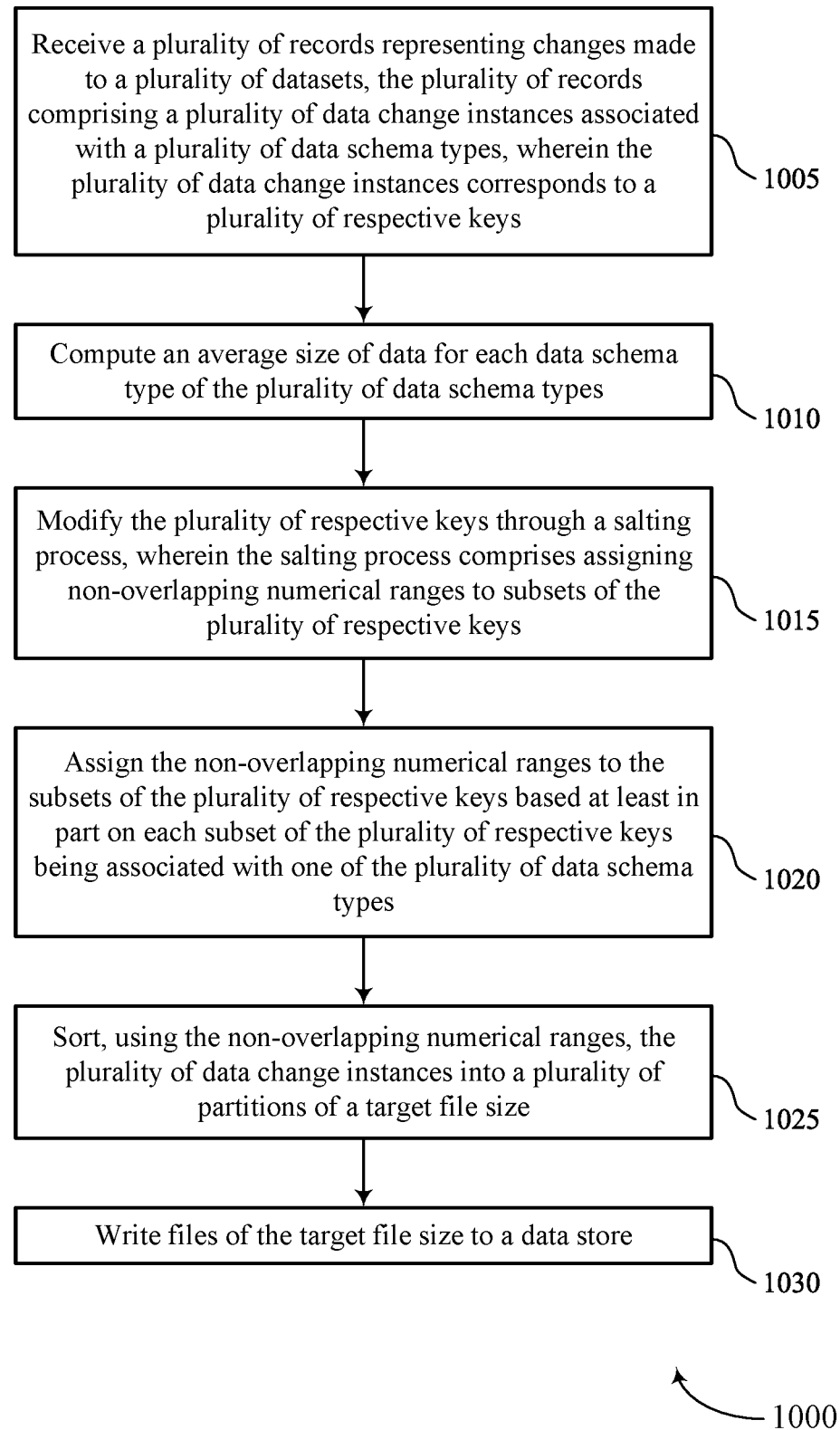

FIG. 10 shows a flowchart illustrating a method 1000 that supports size-based record partitioning in accordance with examples as disclosed herein. The operations of the method 1000 may be implemented by an application server or its components as described herein. For example, the operations of the method 1000 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 1005, the method may include receiving a set of multiple records representing changes made to a set of multiple datasets, the set of multiple records including a set of multiple data change instances associated with a set of multiple data schema types, where the set of multiple data change instances corresponds to a set of multiple respective keys. The operations of 1005 may be performed in accordance with examples as disclosed herein. In some examples, aspects of the operations of 1005 may be performed by a record reception component 625 as described with reference to FIG. 6.

At 1010, the method may include computing an average size of data for each data schema type of the set of multiple data schema types. The operations of 1010 may be performed in accordance with examples as disclosed herein. In some examples, aspects of the operations of 1010 may be performed by a data size computation component 630 as described with reference to FIG. 6.

At 1015, the method may include modifying the set of multiple respective keys through a salting process, where the salting process includes assigning non-overlapping numerical ranges to subsets of the set of multiple respective keys. The operations of 1015 may be performed in accordance with examples as disclosed herein. In some examples, aspects of the operations of 1015 may be performed by a partitioning key component 635 as described with reference to FIG. 6.

At 1020, the method may include assigning the non-overlapping numerical ranges to the subsets of the set of multiple respective keys based on each subset of the set of multiple respective keys being associated with one of the set of multiple data schema types. The operations of 1020 may be performed in accordance with examples as disclosed herein. In some examples, aspects of the operations of 1020 may be performed by a range assignment component 650 as described with reference to FIG. 6.

At 1025, the method may include sorting, using the non-overlapping numerical ranges, the set of multiple data change instances into a set of multiple partitions of a target file size. The operations of 1025 may be performed in accordance with examples as disclosed herein. In some examples, aspects of the operations of 1025 may be performed by a sorting component 640 as described with reference to FIG. 6.

At 1030, the method may include writing files of the target file size to a data store. The operations of 1030 may be performed in accordance with examples as disclosed herein. In some examples, aspects of the operations of 1030 may be performed by a file writing component 645 as described with reference to FIG. 6.

A method is described. The method may include receiving a set of multiple records representing changes made to a set of multiple datasets, the set of multiple records including a set of multiple data change instances associated with a set of multiple data schema types, where the set of multiple data change instances corresponds to a set of multiple respective keys, computing an average size of data for each data schema type of the set of multiple data schema types, modifying the set of multiple respective keys through a salting process, where the salting process includes assigning non-overlapping numerical ranges to subsets of the set of multiple respective keys, sorting, using the non-overlapping numerical ranges, the set of multiple data change instances into a set of multiple partitions of a target file size, and writing files of the target file size to a data store.

An apparatus is described. The apparatus may include a processor, memory coupled with the processor, and instructions stored in the memory. The instructions may be executable by the processor to cause the apparatus to receive a set of multiple records representing changes made to a set of multiple datasets, the set of multiple records including a set of multiple data change instances associated with a set of multiple data schema types, where the set of multiple data change instances corresponds to a set of multiple respective keys, compute an average size of data for each data schema type of the set of multiple data schema types, modify the set of multiple respective keys through a salting process, where the salting process includes assigning non-overlapping numerical ranges to subsets of the set of multiple respective keys, sort, using the non-overlapping numerical ranges, the set of multiple data change instances into a set of multiple partitions of a target file size, and write files of the target file size to a data store.

Another apparatus is described. The apparatus may include means for receiving a set of multiple records representing changes made to a set of multiple datasets, the set of multiple records including a set of multiple data change instances associated with a set of multiple data schema types, where the set of multiple data change instances corresponds to a set of multiple respective keys, means for computing an average size of data for each data schema type of the set of multiple data schema types, means for modifying the set of multiple respective keys through a salting process, where the salting process includes assigning non-overlapping numerical ranges to subsets of the set of multiple respective keys, means for sorting, using the non-overlapping numerical ranges, the set of multiple data change instances into a set of multiple partitions of a target file size, and means for writing files of the target file size to a data store.

A non-transitory computer-readable medium storing code is described. The code may include instructions executable by a processor to receive a set of multiple records representing changes made to a set of multiple datasets, the set of multiple records including a set of multiple data change instances associated with a set of multiple data schema types, where the set of multiple data change instances corresponds to a set of multiple respective keys, compute an average size of data for each data schema type of the set of multiple data schema types, modify the set of multiple respective keys through a salting process, where the salting process includes assigning non-overlapping numerical ranges to subsets of the set of multiple respective keys, sort, using the non-overlapping numerical ranges, the set of multiple data change instances into a set of multiple partitions of a target file size, and write files of the target file size to a data store.

In some examples of the method, apparatuses, and non-transitory computer-readable medium described herein, computing the average size of data for each data schema type of the set of multiple data schema types may include operations, features, means, or instructions for defining respective initial size values for each data schema type, generating respective total output size values for each data schema type based on the respective initial size values, and generating respective average size values for each data schema type based on the respective total output size values and respective quantities of the data change instances associated with each data schema type.

In some examples of the method, apparatuses, and non-transitory computer-readable medium described herein, the salting process may include operations, features, means, or instructions for assigning the non-overlapping numerical ranges to the subsets of the set of multiple respective keys based on each subset of the set of multiple respective keys being associated with one of the set of multiple data schema types.

In some examples of the method, apparatuses, and non-transitory computer-readable medium described herein, the salting process may include operations, features, means, or instructions for assigning random values from the non-overlapping numerical ranges to individual keys of the subsets of the set of multiple respective keys.

Some examples of the method, apparatuses, and non-transitory computer-readable medium described herein may further include operations, features, means, or instructions for determining the target file size for the set of multiple partitions.

Some examples of the method, apparatuses, and non-transitory computer-readable medium described herein may further include operations, features, means, or instructions for calculating total storage sizes for individual data schema types of the set of multiple data schema types based on the target file size and determining the non-overlapping numerical ranges based on the total storage sizes for the individual data schema types.

Some examples of the method, apparatuses, and non-transitory computer-readable medium described herein may further include operations, features, means, or instructions for determining a quantity of files associated with individual data schema types of the set of multiple data schema types based on the target file size and determining the non-overlapping numerical ranges based on the quantity of files associated with the individual data schema types.

Some examples of the method, apparatuses, and non-transitory computer-readable medium described herein may further include operations, features, means, or instructions for sorting the set of multiple data change instances into the set of multiple partitions using a range partitioner that samples an entirety of the set of multiple records.

In some examples of the method, apparatuses, and non-transitory computer-readable medium described herein, each partition only includes files of a same data schema type.

In some examples of the method, apparatuses, and non-transitory computer-readable medium described herein, one or more of the set of multiple respective keys include one of the set of multiple data schema types, a date, a time, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving a plurality of records representing changes made to a plurality of datasets, the plurality of records comprising a plurality of data change instances associated with a plurality of data schema types, wherein the plurality of data change instances corresponds to a plurality of respective keys;
   computing an average size of data for each data schema type of the plurality of data schema types;
   modifying the plurality of respective keys through a salting process, wherein the salting process comprises assigning non-overlapping numerical ranges to subsets of the plurality of respective keys;
   sorting, using the non-overlapping numerical ranges, the plurality of data change instances into a plurality of partitions of a target file size; and
   writing files of the target file size to a data store.

2. The method of claim 1, wherein computing the average size of data for each data schema type of the plurality of data schema types further comprises:
   defining respective initial size values for each data schema type;
   generating respective total output size values for each data schema type based at least in part on the respective initial size values; and
   generating respective average size values for each data schema type based at least in part on the respective total output size values and respective quantities of the data change instances associated with each data schema type.

3. The method of claim 1, wherein the salting process further comprises:
   assigning the non-overlapping numerical ranges to the subsets of the plurality of respective keys based at least in part on each subset of the plurality of respective keys being associated with one of the plurality of data schema types.

4. The method of claim 1, wherein the salting process further comprises:
   assigning random values from the non-overlapping numerical ranges to individual keys of the subsets of the plurality of respective keys.

5. The method of claim 1, further comprising:
   determining the target file size for the plurality of partitions.

6. The method of claim 5, further comprising:
   calculating total storage sizes for individual data schema types of the plurality of data schema types based at least in part on the target file size; and determining the non-overlapping numerical ranges based at least in part on the total storage sizes for the individual data schema types.

7. The method of claim 5, further comprising:
determining a quantity of files associated with individual data schema types of the plurality of data schema types based at least in part on the target file size; and
determining the non-overlapping numerical ranges based at least in part on the quantity of files associated with the individual data schema types.

8. The method of claim 1, further comprising:
sorting the plurality of data change instances into the plurality of partitions using a range partitioner that samples an entirety of the plurality of records.

9. The method of claim 1, wherein each partition only includes files of a same data schema type.

10. The method of claim 1, wherein one or more of the plurality of respective keys comprise one of the plurality of data schema types, a date, a time, or any combination thereof.

11. An apparatus, comprising:
a processor;
memory coupled with the processor; and
instructions stored in the memory and executable by the processor to cause the apparatus to:
receive a plurality of records representing changes made to a plurality of datasets, the plurality of records comprising a plurality of data change instances associated with a plurality of data schema types, wherein the plurality of data change instances corresponds to a plurality of respective keys;
compute an average size of data for each data schema type of the plurality of data schema types;
modify the plurality of respective keys through a salting process, wherein the salting process comprises assigning non-overlapping numerical ranges to subsets of the plurality of respective keys;
sort, using the non-overlapping numerical ranges, the plurality of data change instances into a plurality of partitions of a target file size; and
write files of the target file size to a data store.

12. The apparatus of claim 11, wherein the instructions to compute the average size of data for each data schema type of the plurality of data schema types are further executable by the processor to cause the apparatus to:
define respective initial size values for each data schema type;
generate respective total output size values for each data schema type based at least in part on the respective initial size values; and
generate respective average size values for each data schema type based at least in part on the respective total output size values and respective quantities of the data change instances associated with each data schema type.

13. The apparatus of claim 11, wherein the instructions to modify the plurality of respective keys through the salting process are further executable by the processor to cause the apparatus to:
assign the non-overlapping numerical ranges to the subsets of the plurality of respective keys based at least in part on each subset of the plurality of respective keys being associated with one of the plurality of data schema types.

14. The apparatus of claim 11, wherein the instructions to modify the plurality of respective keys through the salting process are further executable by the processor to cause the apparatus to:
assign random values from the non-overlapping numerical ranges to individual keys of the subsets of the plurality of respective keys.

15. The apparatus of claim 11, wherein the instructions are further executable by the processor to cause the apparatus to:
determine the target file size for the plurality of partitions.

16. The apparatus of claim 15, wherein the instructions are further executable by the processor to cause the apparatus to:
calculate total storage sizes for individual data schema types of the plurality of data schema types based at least in part on the target file size; and
determine the non-overlapping numerical ranges based at least in part on the total storage sizes for the individual data schema types.

17. The apparatus of claim 15, wherein the instructions are further executable by the processor to cause the apparatus to:
determine a quantity of files associated with individual data schema types of the plurality of data schema types based at least in part on the target file size; and
determine the non-overlapping numerical ranges based at least in part on the quantity of files associated with the individual data schema types.

18. The apparatus of claim 11, wherein the instructions are further executable by the processor to cause the apparatus to:
sort the plurality of data change instances into the plurality of partitions using a range partitioner that samples an entirety of the plurality of records.

19. The apparatus of claim 11, wherein one or more of the plurality of respective keys comprise one of the plurality of data schema types, a date, a time, or any combination thereof.

20. A non-transitory computer-readable medium storing code, the code comprising instructions executable by a processor to:
receive a plurality of records representing changes made to a plurality of datasets, the plurality of records comprising a plurality of data change instances associated with a plurality of data schema types, wherein the plurality of data change instances corresponds to a plurality of respective keys;
compute an average size of data for each data schema type of the plurality of data schema types;
modify the plurality of respective keys through a salting process, wherein the salting process comprises assigning non-overlapping numerical ranges to subsets of the plurality of respective keys;
sort, using the non-overlapping numerical ranges, the plurality of data change instances into a plurality of partitions of a target file size; and
write files of the target file size to a data store.

* * * * *